June 9, 1942.   C. V. BERGLUND   2,285,557
FLUID PRESSURE SYSTEM
Filed Oct. 25, 1939   2 Sheets-Sheet 1

INVENTOR.
CHARLES V. BERGLUND
BY
ATTORNEY.

June 9, 1942. C. V. BERGLUND 2,285,557
FLUID PRESSURE SYSTEM
Filed Oct. 25, 1939 2 Sheets-Sheet 2
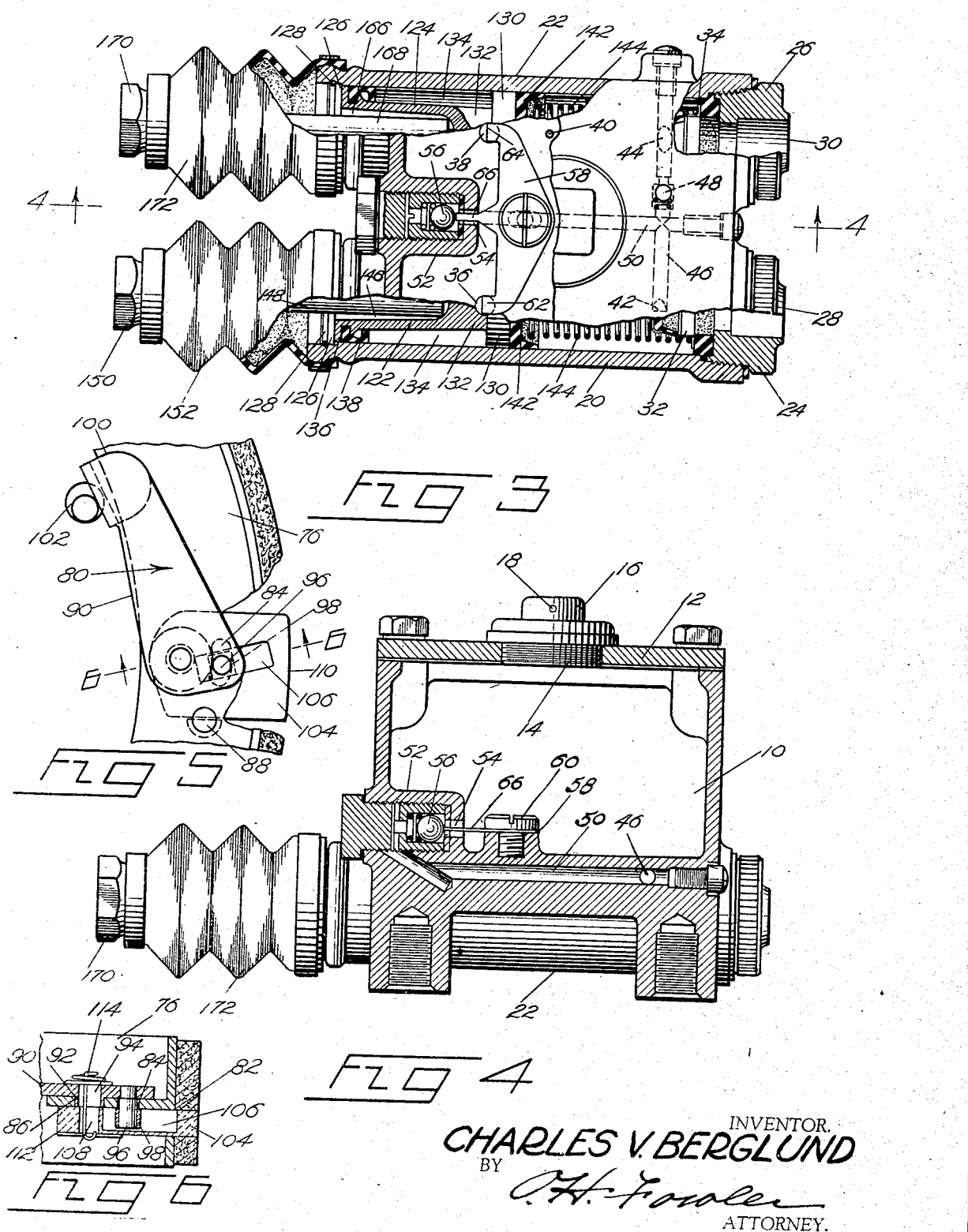
INVENTOR.
CHARLES V. BERGLUND
BY
ATTORNEY.

Patented June 9, 1942

2,285,557

UNITED STATES PATENT OFFICE 2,285,557

FLUID PRESSURE SYSTEM

Charles V. Berglund, Detroit, Mich., assignor to Hydraulic Brake Company, Detroit, Mich., a corporation of California Application October 25, 1939, Serial No. 301,285

13 Claims. (Cl. 60—54.5)

This invention relates to fluid pressure systems.

Broadly the invention comprehends a fluid pressure system for a motor vehicle including means for actuating the clutch and the brakes of the vehicle.

An object of the invention is to provide a fluid pressure system operative to actuate the clutch and brakes of a motor vehicle in sequence, also individually, or concomitantly, as may be elected by the operator.

Another object of the invention is to provide a fluid pressure system for control of a motor vehicle including means for actuating the clutch and brakes of the vehicle successively by a single actuator.

Another object of the invention is to provide a fluid pressure system for control of the clutch and brakes of a motor vehicle including means for actuating the clutch independently of the brakes, means for actuating the clutch and brakes successively by a single actuator, means for actuating the brakes independently of the clutch, means for actuating the clutch and brakes concomitantly, and means for actuating the clutch and brakes successively and augmenting the actuative force of the brakes.

Yet another object of the invention is to provide a fluid pressure system including a duplex fluid pressure producing device or master cylinder having interconnected fluid pressure producing means.

A further object of the invention is to provide a fluid pressure producing device or master cylinder including two interconnected chambers or cylinders having independent discharge ports and means for displacing fluid from one of the cylinders through its discharge ports and also through the associated cylinder and its discharge port.

Yet a further object of the invention is to provide a duplex fluid pressure producing device or master cylinder and actuators therefor comprising linkage including a toggle and a foot pad supported on the knee of the toggle.

Other objects and advantages of the invention will appear from the following description taken in connection with the drawings forming a part of this specification, and in which—

Fig. 3 is a top plan view of the fluid pressure producing device;

Fig. 4 is a sectional view, substantially on line 4—4, Fig. 3;

Fig. 5 is a fragmentary view of a braking element and an adjusting device therefor; and Fig. 6 is a sectional view substantially on line 6—6, Fig. 5.

Figure 1:
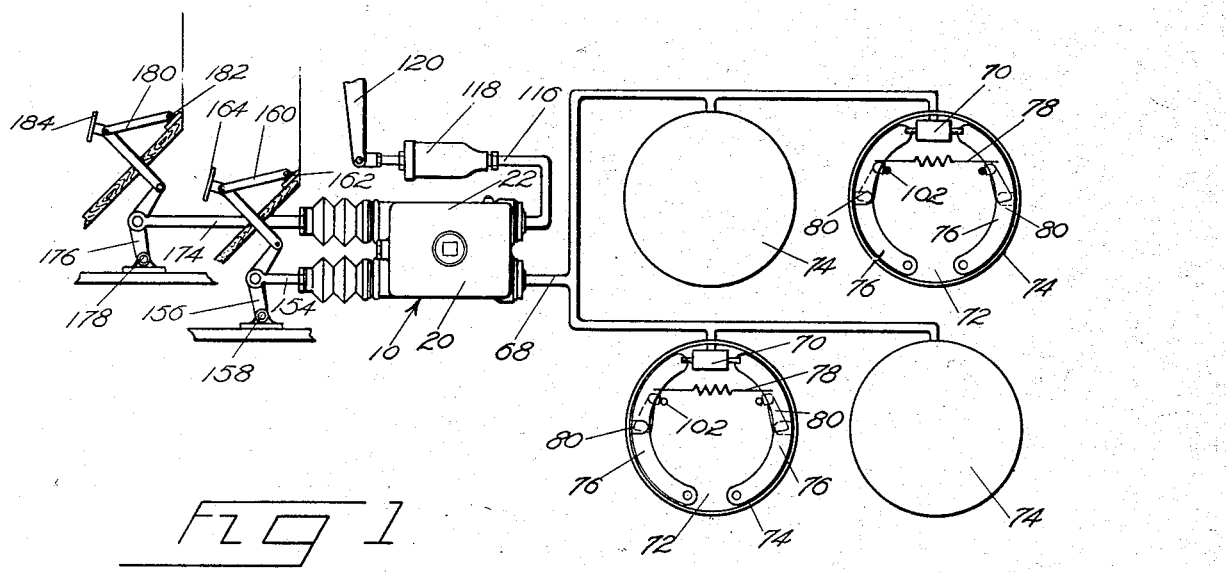
Fig. 1 is a diagrammatical illustration of a fluid pressure brake system embodying the invention.
Figure 2:
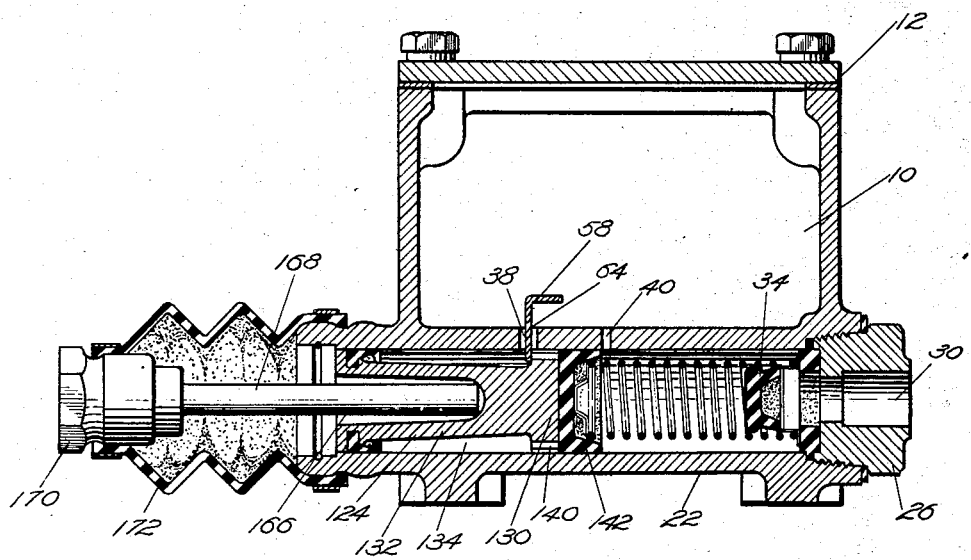
Fig. 2 is a vertical sectional view of the fluid pressure producing device.

Referring to the drawings for more specific details of the invention, a fluid pressure producing device or master cylinder adapted to be attached to the frame of a motor vehicle chassis includes a reservoir 10 having a cover plate 12 provided with a filling opening 14 normally closed as by a plug 16 having openings 18 therethrough for venting the reservoir to the atmosphere and at the base of the reservoir are corresponding cylinders 20 and 22 arranged in parallel relation to one another.

The cylinders 20 and 22 are open at one end and closed at the other end as by heads 24 and 26 having discharge ports 28 and 30 controlled as by two-way valves 32 and 34. The cylinders have ports 36 and 38 providing communications between the cylinders and the reservoir 10, and the cylinder 22 has a conventional compensating port 40.

Arranged in the wall of the cylinders adjacent the closed ends thereof are ports 42 and 44 connected by a passage 46 controlled by a spring-pressed valve 48 providing for the passage of fluid only from the cylinder 22 through the port 44, the passage 46 and the port 42 into the cylinder 20, and a passage 50 connected to the passage 46 between the valve 48 and the port 42 communicates with a valve chamber 52 having a port 54 opening into the reservoir, and a spring-pressed valve 56 in the chamber 52 controls the port 54. The valve 56 is normally held open as by a yoke 58 slidably mounted on a stud 60 in the bottom of the reservoir. As shown, the yoke has depending tangs 62 and 64 on its arms extended through the ports 36 and 38 into the cylinders 20 and 22, and arranged centrally of the yoke is an arm 66 adapted to engage the ball valve 56 so as to hold the valve open.

A fluid pressure delivery pipe or conduit 68 suitably connected to the discharge port 28 of the cylinder 20 has branches connected respectively to fluid pressure actuated motors 70, preferably arranged in pairs, one pair for actuating brakes associated with the front wheels of the vehicle, and another pair for actuating the brakes associated with the rear wheels of the vehicle.

The brakes are preferably of conventional type, each including a fixed support or backing plate 72, a drum 74 associated with the backing plate, a pair of conventional corresponding interchangeable friction elements or shoes 76 pivoted on the backing plate for cooperation with the drum, a retractile spring 78 connecting the shoes, and a motor corresponding to the motors 70 mounted on the backing plate and connected to the shoes for actuating the shoes into engagement with the drum against the resistance of the retractile spring 78.

Each of the friction elements or shoes 76 carries an automatic adjuster, indicated generally at 80. As shown, the rim of the shoe has therein a slot 82, and the web of the shoe has therein an arcuate slot 84, a transverse bore 86, and arranged on the web is a guide pin 88. A lever 90 fulcrumed on the shoe has for its fulcrum a lateral sleeve 92 registering with a bore 94 through the lever, and the sleeve is received in the bore 86. A pin 96 on one end of the lever extends through the arcuate slot 84, and loosely sleeved on this pin is a rectangular washer 98. The other end of the lever is bent upon itself as indicated at 100 so as to embrace the web of the shoe and to provide a means adaptable for engagement with a conventional retractile stop 102 mounted on the backing plate 72.

A block 104 has a diagonal slot 106 extended partly through the block and a transverse bore 108 adjacent one end of the slot. One end of the block has a radius 110 commensurate with the radius of the shoe, and this end of the block is fitted for movement in the slot 82 through the rim of the shoe for engagement with the drum 74.

The diagonal slot 106 in the block receives the rectangular washer 98 on the pin 96 carried by the lever 90, and the bore 108 in the block registers with the lateral sleeve 92 on the lever and the bore 86. A light spring plate 112 flapped against the block over the bore 108 has secured thereto a spring 114 superimposed on the lever 90 serving to frictionally clamp the block and the lever to the web of the shoe.

Because of a differential in the coefficient of friction between the linings of the shoes 76 and the block 104, during a normal braking operation, there is relative movement between the shoe and the block. This movement of the block is proportionate to wear on the lining on the shoe and is transversely of the shoe against frictional resistance imposed by the spring 114.

During this movement, the rectangular washer 98 in the diagonal slot 106 in the block 104 slides in the slot, and this movement of the washer is transmitted to the lever 90 and imparts thereto slight angular movement of the lever on its fulcrum so that at the conclusion of a braking operation and return of the shoe to its retractile position on the stop 102 the shoe is supported, when the brake is at rest, in proper spaced relation to the drum.

Because of the wedging action between the guide pin 88 on the web of the shoe and the rectangular washer 98 on the pin 96 carried by the lever, retrograde movement of the block 104 is inhibited. This is of importance because of the tendency to maladjustment of the block 104 due to the snapping action of the retractile spring 89 connecting the shoes 76, occurring upon release of the brake at the conclusion of a braking operation.

A fluid pressure delivery pipe or conduit 116 connects the discharge port 30 of the cylinder 22 to a fluid pressure actuated motor 118 suitably connected to and operative for activating an actuator 120 of a conventional clutch, not shown.

Corresponding pistons 122 and 124 reciprocable in the cylinders 20 and 22 are held against displacement by washers 126 seated on retaining rings 128 fitted in grooves in the walls of the cylinders adjacent their open ends. Each of the pistons has a head 130, a reduced body portion 132 providing in conjunction with the wall of the cylinder an annular chamber 134 communicating with the reservoir 10 by way of the ports 36 or 38, and a skirt 136 supporting a sealing cup 138.

When the pistons are in retracted position, the heads 130 of the pistons normally engage the tangs 62 and 64 on the yoke 58 to retain the arm 66, also on the yoke, in engagement with the ball valve 56 so as to hold the valve open. The head 130 of each piston has a plurality of passages 140 therethrough providing communication between the annular chamber 134 and that portion of the cylinder forward of the piston. A collapsible sealing cup 142 seated on the head of each piston controls the passages 140, and a spring 144 interposed between the sealing cup 142 and the two-way valve 32 or 34 serves to retain the cup and valve against displacement and also to return the piston to retracted position.

The piston 122 has in its back a recess 146 for the reception of one end of a thrust pin 148 having on its other end a coupling 150 connected to the open end of the cylinder 20 as by a flexible boot 152, for exclusion of dust and other foreign substances from the cylinder. A rod 154 connects the coupling 150 to a lever 156 rockable on stub shafts 158 and connected as by a retractile spring, not shown, to a fixed support, and a toggle 160 connecting the lever 156 to a fixed support 162 preferably arranged on the foot board of the vehicle has pivoted to its knee a foot pad 164.

Correspondingly, the piston 124 has in its back a recess 166 for the reception of one end of a thrust pin 168 having on its other end a coupling 170 connected by a flexible boot 172 to the open end of the cylinder 22 for the exclusion of dust and other foreign substances from the cylinder. A rod 174 connects the coupling 170 to a lever 176 rockable on a stub shaft 178 and connected by a retractile spring, not shown, to a fixed support, and a toggle 180 connecting the lever to a fixed support 182 suitably arranged on the foot board of the vehicle has mounted on its knees a foot pad 184.

Assuming that the system is installed on a motor vehicle substantially as illustrated and described, and that the system is filled with a suitable fluid, under these conditions, upon depressing the foot pad 184, the toggle 180 is spread, and force is transmitted therefrom through the lever 176, the rod 174, and the thrust pin 168 to the piston 124 resulting in advancing the piston on its compression stroke.

As the piston advances, the sealing cup on the head thereof closes the compensating port 40, and simultaneously therewith the yoke 58 is released, resulting in releasing the valve 56, and consequent closing communication between the cylinder 20 and the reservoir 10, followed by creation of pressure on the fluid in the cylinder 22 forward of the piston 124 and displacement of fluid from the cylinder 22 past the two-way valve 34, thence through the discharge port 30 and fluid pressure delivery pipe 116 into the fluid pressure actuated motor 118, causing energization of the motor with the resultant actuation of the clutch lever 120 and consequent disengagement of the clutch.

When the pressure on the fluid in the cylinder 22, the fluid pressure delivery pipe 116 and fluid pressure actuated motor 118, reaches a predetermined degree slightly more than ample for disengagement of the clutch, the spring-pressed valve 48 cracks, and fluid is displaced from the cylinder 22 through the port 44, the passage 46, and the port 42 into the cylinder 20, thence past the two-way valve 32, through the discharge port 28 and fluid pressure delivery pipe 68 and its branches into the fluid pressure actuated motors 70, causing energization of these motors with the resultant movement of the braking or friction elements 76, against the resistance of the retractile springs 78, into engagement with the drums 74 so as to effectively retard rotation of the drums. From the foregoing it is clear that the clutch may be operated independently of the brakes, since the brakes are operative only after creation of more than ample pressure on the fluid in the system to operate the clutch.

Upon actuation of the brakes through the operation hereinabove described, should it be found desirable to apply the brakes with additional force, the operator may depress the foot pad 164. This results in spreading the toggle 160 and transmission of force therefrom through the lever 156, the rod 154, and thrust pin 148, to the piston 122, resulting in advancing the piston on its compression stroke accompanied by displacement of fluid from the cylinder 20, past the two-way valve 32, thence through the discharge port 28 and fluid pressure delivery pipe 68 and the branches thereof, into the motors 70, causing further energization of the motors with the resultant further movement of the shoes 76 into the drums 74. It is, of course, to be understood that the latter operation hereinabove described may be accomplished independently of the operation of the clutch, and while the clutch is still engaged. A braking operation of this character is common practice in instances where it is desired to check the speed of a motor vehicle without disconnecting the power plant or motor thereof.

Upon conclusion of a normal sole operation of the cylinder 22, the foot pad 184 is released and returns to its normal position under the influence of a conventional retractile spring, preferably connected to the lever 176. This results in release of the piston 124 and return of this piston to its retracted position under the influence of the retractile spring 144, and the consequent release of pressure on the fluid in the system. When the piston 124 returns to its retracted position, the yoke 58 is actuated to engage and open the valve 56 so as to estabilsh communication between the reservoir 10 and the cylinder 20.

As the piston 124 returns to its retracted position, a partial vacuum is created in the cylinder 22 forward of the piston. This results in drawing fluid from the reservoir 10, through the port 38 into the annular chamber 134, thence through the passages 140, past the sealing cup 142, into that portion of the cylinder forward of the piston, completely filling the cylinder.

During this operation, the fluid in the fluid pressure actuated motor 118 and the fluid pressure delivery pipe 116 connecting this motor to the cylinder is returning to the cylinder 22 under the influence of the clutch lever 120 actuated by the clutch under normal operating conditions. This may result in the cylinder 22 receiving a quantity of fluid in excess of that required to fill the cylinder, and under this condition the excess fluid received by the cylinder 22 is returned to the reservoir 10 by way of the compensating port 40. This concludes the cycle in the operation of the clutch only.

In instances where the clutch and brakes have been operated successively, during the period fluid is returning to the cylinder 22 from the motor 118 and fluid pressure delivery pipe 116, fluid is also returning to the cylinder 20 from the fluid pressure actuated motors 70 associated with the brakes and the fluid pressure delivery pipe 68 and its branches connecting these motors to the cylinder 20 under the influence of the retractile springs 78, and since the valve 48 is closed and the valve 56 open, any quantity of fluid received by the cylinder 20 in excess of that required to completely fill the cylinder is returned to the reservoir by way of the port 42, the passages 46 and 50, the valve chamber 52, and the port 54.

In instances where the brakes have been actuated independently or to augment the actuation of the brakes when operated in conjunction with the clutch, upon conclusion of a braking operation, the foot pad 164 is released and is returned to its retracted position under the influence of a conventional retractile spring preferably connected to the lever 156. This results in retraction of the toggle 160, the lever 156, and thrust pin 158, and consequent release of the piston 122, and return of the piston to its retracted position under the influence of the spring 144. When the piston is in fully retracted position, the head thereof engages the yoke 58 and opens the valve 56 so as to establish communication between the reservoir and the cylinder 20. As the piston returns to retracted position, a partial vacuum is created in the cylinder 20, resulting in drawing fluid from the reservoir 10, through the port 36, into the annular chamber 134 back of the piston, thence through the passages 140 in the head of the piston, past the sealing cup 142, into that portion of the cylinder forward of the piston, completely filling the cylinder. During this operation, fluid is returning to the cylinder 20 from the fluid pressure actuated motors 70 and the fluid pressure delivery pipe 68 and branches thereof connecting these motors to the cylinder 20 under the influence of the retractile springs 78. This may result in the cylinder receiving a quantity of fluid in excess of its capacity, and in that event the excessive fluid is returned from the cylinder 20 to the reservoir 10 by way of the port 42, the passages 46 and 50, the valve chamber 52, and port 54.

It is to be understood that the valve 56 is adapted to be closed by the actuation of either piston 122 or 124 and it is thereby necessary that both pistons be in retarded position to permit an opening of the valve. It will be readily comprehended that the system possesses great flexibility for it is clear that the clutch may be operated independently of the brakes, that the clutch and brakes may be operated successively by a single actuator, that the brakes may be operated independently, and that the clutch and brakes may be operated successively and the brakes further actuated so as to increase the effectiveness thereof, or to compensate for excessive pedal travel as in instances of fade-out due to drum expansion.

An important factor is the operation of the clutch and brake successively by a single actuator particularly in that the clutch may be held disengaged and the brakes held applied simultaneously by one foot of the operator so that the operator's other foot may be free for actuation of the accelerator of the motor of the vehicle. This is particularly desirable when the vehicle has been stopped while ascending an incline, giving the vehicle a tendency to roll backward during the interval of releasing the brake and speeding up the motor of the vehicle.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A duplex master cylinder unit having two cylinders interconnected by a passage provided with pistons movable in the cylinders for creating pressure, a check valve for control of flow of fluid from one cylinder to the other, a reservoir, and mechanism including a ball valve adapted to be actuated by the pistons operative to provide communication between said reservoir and said passage when both cylinders are relieved of pressure.

2. A duplex master cylinder unit having two cylinders interconnected by a passage provided with means controlling flow of fluid from one cylinder to the other, a piston in each cylinder, a reservoir, means for connecting said reservoir and said passage, and means operated by movement of both pistons to retracted position to actuate said connecting means to open communication between said passage and reservoir and operated upon advance of either of said pistons to actuate said connecting means to close said communication.

3. A fluid pressure system comprising a pressure producing device including a pair of cylinders, a piston movable in each of the cylinders, means providing communication between the cylinders, fluid pressure responsive means controlling the communication, a fluid pressure actuated motor connected to each cylinder, said motors activated successively by actuation of one of the pistons, and one of the motors further activated by actuation of the other piston.

4. A fluid pressure system comprising a pressure producing device including a reservoir, a pair of cylinders supplied therefrom, a communication between the cylinders, pressure responsive means in the communication, a piston movable in each of the cylinders for creation of pressures on the fluid in the system, an individual fluid pressure actuated motor connected to one of the cylinders, a group of fluid pressure actuated motors connected to the other cylinder, said individual motor and group of motors activated successively upon actuation of one of the pistons, and the group of motors further activated upon actuation of the other piston.

5. A fluid pressure producing device comprising a reservoir, a pair of cylinders associated therewith, a passage connecting at least one of the cylinders with the reservoir, means controlling the passage, a second passage connecting the cylinders, valve means controlling the second passage, pistons reciprocable in the cylinders, and individual actuators for the pistons adapted to permit sole, concomitant or successive operation of the pistons.

6. A fluid pressure producing device comprising a reservoir, a pair of cylinders associated therewith having supply ports communicating with the reservoir, a passage connecting the cylinders, means controlling the passage, a second passage connecting one of the cylinders to the reservoir, a valve controlling the flow of fluid through the second passage, trip mechanism for the valve having parts extended through the supply ports into the cylinder, and pistons reciprocable in the cylinders adapted to engage said parts when in their retracted position.

7. A fluid pressure producing device comprising a reservoir, a pair of cylinders associated therewith having supply ports communicating with the reservoir, said cylinders closed at one end as by heads having discharge ports and open at their other ends, valves for control of the discharge ports, a passage connecting the cylinders adjacent the discharge ports, means controlling the flow of fluid through the passage, a valve chamber communicating with the reservoir and a passage connecting the chamber to one of the cylinders, a valve in the chamber for control of the communication, trip mechanism for the valve having parts extended through the supply ports into the cylinders, pistons reciprocable in the cylinders adapted to engage said parts when in retracted position so as to hold the valve open, and means for actuating the pistons.

8. A fluid pressure producing device comprising a reservoir, a pair of interconnected cylinders communicating directly with the reservoir, pistons movable in the cylinders for creating pressure, means for actuating the pistons, a valve controlling the communication between one of the cylinders and the reservoir, means controlling the flow of fluid from one cylinder to the other, said valve operative to close the communication between the one cylinder and reservoir upon advance of either piston.

9. A fluid pressure producing device comprising a reservoir, a pair of cylinders in direct communication with the reservoir, communication between the cylinders, a discharge port for each of the cylinders, pistons reciprocable in the cylinders, means for actuating the pistons, means controlling the communication between one cylinder and the reservoir, and means actuated by advance of either piston for closing off the communication between the one cylinder and the reservoir.

10. A duplex master cylinder unit having two cylinders interconnected by a passage provided with pistons movable in the cylinders for creating pressure, a valve for control of flow of fluid from one cylinder to the other, a reservoir, a second passage independent of one cylinder and providing a communication between the other cylinder and the reservoir, a valve means in the second passage, and means in the cylinders cooperating with the pistons for control of the valve means.

11. A duplex master cylinder unit having two cylinders interconnected by a passage provided with means controlling flow of fluid from one cylinder to the other, a reservoir, a piston in each cylinder, individual means for actuation of the pistons, a passage between the reservoir and one of the cylinders, a spring-pressed valve controlling this passage, a yoke mounted in the reservoir normally retaining the passage between the cylinder and reservoir open when the pistons are in their retracted positions, and operative to permit closing of the valve upon advance of either piston.

12. A fluid pressure system comprising a pressure producing device including a pair of cylinders, a communication between the cylinders, a piston reciprocable in each of the cylinders, means controlling the communication, independent fluid pressure actuated motors connecting each of the cylinders, said means controlling the communication between the cylinders responsive to predetermined fluid pressure to permit operation of the motors by activating one only of the pistons.

13. A fluid pressure system comprising a pressure producing device including a reservoir, a pair of cylinders supplied therefrom, a communication between the cylinders, a piston movable in each of the cylinders for creation of pressures on the fluid in the system, a passage providing communication between one of the cylinders and the reservoir, pressure responsive means in the communication between the cylinders, a valve in the passage, fluid pressure actuated motors connected to each of the cylinders, means for the absolute actuation of either piston, means responsive upon movement of one of the pistons to permit closing of the passage by the valve, said piston adapted to actuate the motors connected to the cylinder in which it is reciprocable, and thereafter as the piston is further advanced to increase the pressure on the fluid, the pressure responsive means between the cylinders is actuated to permit passage of fluid with a consequent actuation of the motors connected to the other cylinder.

CHARLES V. BERGLUND.